US007662444B2

(12) United States Patent
Hiji et al.

(10) Patent No.: US 7,662,444 B2
(45) Date of Patent: Feb. 16, 2010

(54) LIQUID CRYSTAL MICROCAPSULE, METHOD FOR PRODUCING THE SAME, AND LIQUID CRYSTAL DISPLAY DEVICE USING THE SAME

(75) Inventors: Naoki Hiji, Ebina (JP); Shigeru Yamamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 259 days.

(21) Appl. No.: 11/179,658

(22) Filed: Jul. 13, 2005

(65) Prior Publication Data
US 2006/0115604 A1 Jun. 1, 2006

(30) Foreign Application Priority Data
Dec. 1, 2004 (JP) ............................. 2004-348460

(51) Int. Cl.
*G02F 1/1334* (2006.01)
*B01J 13/18* (2006.01)
(52) U.S. Cl. .................. 428/1.3; 345/107; 430/45.33; 428/1.2; 427/213.34; 264/4.7
(58) Field of Classification Search .............. 264/4–4.7; 428/1.3; 345/107; 430/45.33; 427/213.3, 427/213.34, 213.36
See application file for complete search history.

(56) References Cited
U.S. PATENT DOCUMENTS
3,217,035 A * 11/1965 Guenthner et al. ............ 564/96

| 5,037,716 A | * | 8/1991 | Moffat | ................... | 430/110.2 |
| 5,250,698 A | * | 10/1993 | Falk et al. | ................... | 548/260 |
| 5,283,015 A | * | 2/1994 | Hutchings et al. | ........... | 264/4.7 |
| 5,335,101 A | * | 8/1994 | Reamey | ........................ | 349/93 |
| 6,174,467 B1 | * | 1/2001 | Hsu | ........................... | 264/4.7 |
| 6,377,387 B1 | * | 4/2002 | Duthaler et al. | ............. | 359/296 |
| 6,582,759 B1 | * | 6/2003 | Qiu et al. | ................. | 427/163.1 |
| 7,041,304 B2 | * | 5/2006 | Ju et al. | ....................... | 424/401 |
| 7,147,915 B2 | * | 12/2006 | Kawai et al. | .............. | 428/402.2 |
| 7,236,290 B1 | * | 6/2007 | Zhang et al. | ................. | 359/296 |
| 7,286,279 B2 | * | 10/2007 | Yu et al. | ...................... | 359/296 |
| 2003/0087104 A1 | * | 5/2003 | Dhar et al. | ............... | 428/422.8 |
| 2005/0271735 A1 | * | 12/2005 | Stover et al. | ................ | 424/490 |

FOREIGN PATENT DOCUMENTS
JP A 2002-275471 9/2002

* cited by examiner

*Primary Examiner*—Sophie Hon
(74) *Attorney, Agent, or Firm*—Oliff & Berridge, PLC

(57) ABSTRACT

A liquid crystal microcapsule, comprising a liquid crystal and a polyurea film encapsulating the liquid crystal, wherein at least one of an alkyl group and a fluoroalkyl group is bonded directly or indirectly via a urethane bond to the polyurea.

A method of producing a liquid crystal microcapsule, comprising: forming a polyurea and the film thereof by allowing an aligner, which is a compound having a hydroxyl group and at least one of an alkyl group and a fluoroalkyl group, to react with a polyisocyanate, a polyamine, and water; and encapsulating a liquid crystal with the film.

A liquid crystal display device using the liquid crystal microcapsule.

25 Claims, 4 Drawing Sheets

ALIGNMENT DIRECTION OF LIQUID CRYSTAL

WHEN NO VOLTAGE IS APPLIED

ALIGNMENT DIRECTION OF LIQUID CRYSTAL

WHEN A VOLTAGE IS APPLIED

ALIGNMENT DIRECTION OF LIQUID CRYSTAL

WHEN NO VOLTAGE IS APPLIED

ALIGNMENT DIRECTION OF LIQUID CRYSTAL

WHEN A VOLTAGE IS APPLIED

LIQUID CRYSTAL MICROCAPSULE, METHOD FOR PRODUCING THE SAME, AND LIQUID CRYSTAL DISPLAY DEVICE USING THE SAME

CROSS-REFERENCE TO RELATED APPLICATION

This application claims priority under 35 USC 119 from Japanese Patent Application No. 2004-348460, the disclosure of which is incorporated by reference herein.

BACKGROUND OF THE INVENTION

1. Field of the Invention

The present invention relates to a liquid crystal microcapsule for use in display devices, image/information-recording devices, image/information-recording media, spatial light modulators, a method for producing the same, and a liquid crystal display device using the same.

2. Description of the Related Art

Liquid crystals have been widely used as a material for displays. However, since liquid crystals are liquid in nature, in order to use them it is necessary to inject them into a cell formed between two substrates spaced at a certain distance. Liquid crystal systems are problematic in that it takes time to inject the liquid crystal and displayed images are easily distorted by changes in the distance between the two substrates when a force is applied to a cell, for example, by pushing or bending.

It is possible to overcome these problems by producing a liquid crystal microcapsule by encapsulating the liquid crystal with a film. This is advantageous in that the liquid crystal microcapsule, wherein the liquid crystal is protected by a film, is resistant to a pushing or bending force and eliminates the time-consuming process of injecting the liquid crystal as it is possible to form such a cell by coating the liquid crystal microcapsules on a substrate.

Usually, when a liquid crystal is used in a display device, control of the alignment of the liquid crystal is important for making the liquid crystal exhibit its inherent performance sufficiently. For example, Japanese Patent Application Laid-Open (JP-A) No. 2002-275471 discloses a method of improving display contrast by using a particular film material for a liquid crystal microcapsule, wherein a guest-host liquid crystal, i.e., a liquid crystal containing a dissolved dichroic colorant, is encapsulated, and thus controlling the alignment of the liquid crystal molecule in a direction perpendicular to the internal surface of the film.

FIGS. 4A to 4D show the alignment states of a liquid crystal in a liquid crystal microcapsule without alignment control and those of a liquid crystal in a liquid crystal microcapsule with alignment control. In FIGS. 4A to 4D, 11 represents a substrate; 12, an electrode; 13, a binder; and 14, a liquid crystal microcapsule. As shown in FIG. 4A, in the alignment-uncontrolled liquid crystal microcapsule, the liquid crystal becomes colored, orienting itself substantially in parallel with the substrate surface when no voltage is applied. When a nematic liquid crystal having a positive dielectric anisotropy is used as the liquid crystal and a voltage is applied between the two electrodes, the liquid crystal orients itself in the direction perpendicular to the substrate and becomes transparent as shown in FIG. 4B. At the interface with the film, the liquid crystal is oriented so as to curve along the interface, and thus there remain some areas in the liquid crystal where the liquid crystal is oriented perpendicular to the substrate surface, prohibiting sufficient color density.

On the other hand, when controlled so as to orient perpendicular to the film surface, the liquid crystal orients itself in a direction substantially perpendicular to the substrate surface and becomes transparent, as shown in FIG. 4C. When a nematic liquid crystal having a negative dielectric anisotropy is used as the liquid crystal and a voltage is applied between the two electrodes, as shown in FIG. 4D, the liquid crystal orients itself in a direction parallel to the substrate surface and become colored. In such a case, the liquid crystal, which is forcibly oriented in parallel with the substrate surface under application of a voltage, has a parallelism higher than that of FIG. 4A. Thus, the color density thereof is heightened and the display contrast is improved.

Accordingly, it is important to make the film internal surface more effective in inducing perpendicular alignment in order to improve the display performance of liquid crystal microcapsules.

As a method of making the film internal surface of liquid crystal microcapsules effective in inducing perpendicular alignment, a method of mixing a radical-polymerizable monomer having an alkyl group or a fluoroalkyl group with a liquid crystal, dispersing the mixture in water, and then forming a film by polymerization under heat is disclosed in JP-A No. 2002-275471 described above.

Because radical polymerization proceeds everywhere in the dispersion phase, it is necessary to devise a method of ensuring that the polymers move to the interface between the liquid crystal and the aqueous phase in order to form a uniform film of the generated polymers. Thus, it is necessary to control the surface tension of the polymer in a range between that of the liquid crystal and the external aqueous phase and to adjust the precipitation rate of the polymer to within a suitable range. However, the problem has existed that it has not been possible to form a film, or only possible to form a film having pores or inferior mechanical properties, because the conditions above have not always been satisfied depending on the kind of liquid crystal, and the combination thereof with the monomer, used. With such a film, it has only been possible to produce liquid crystal microcapsules inferior in the perpendicular aligning efficiency.

To avoid this problem, the same patent disclosed a method of strengthening the film by forming an additional film over liquid crystal microcapsules by adding a dispersion of the monomer to the dispersion of liquid crystal microcapsules having a film already formed, connecting monomers onto the film, and hardening the resulting film. However, the method was problematic in terms of the tedious procedures demanded for production.

SUMMARY OF THE INVENTION

The invention, which was made in view of the above circumstances, provides a liquid crystal microcapsule having a uniform film thickness and a favorable perpendicular aligning efficiency, and a convenient method for producing the same. The invention also provides a liquid crystal display device employing the liquid crystal microcapsule.

A first aspect of the invention is to provide a liquid crystal microcapsule, comprising a liquid crystal and a polyurea film encapsulating the liquid crystal, wherein at least one of an alkyl group and a fluoroalkyl group is bonded directly or indirectly via a urethane bond to the polyurea.

A second aspect of the invention is to provide a method of producing a liquid crystal microcapsule, comprising: forming a polyurea and a film thereof by allowing an aligner, which is a compound having a hydroxyl group and at least one of an alkyl group and a fluoroalkyl group, to react with a polyisocyanate and water; and encapsulating a liquid crystal with the film.

A third aspect of the invention is to provide a method of producing a liquid crystal microcapsule, comprising: forming a polyurea and the film thereof by allowing an aligner, which is a compound having a hydroxyl group and at least one of an alkyl group and a fluoroalkyl group, to react with a polyisocyanate, a polyamine, and water; and encapsulating a liquid crystal with the film.

A fourth aspect of the invention is to provide a liquid crystal display device, comprising a pair of electrodes and the liquid crystal microcapsule according to the first aspect placed therebetween.

DETAILED DESCRIPTION OF THE INVENTION

Hereinafter, the liquid crystal microcapsule and the method for producing the same according to the present invention will be described.

Figure 1:
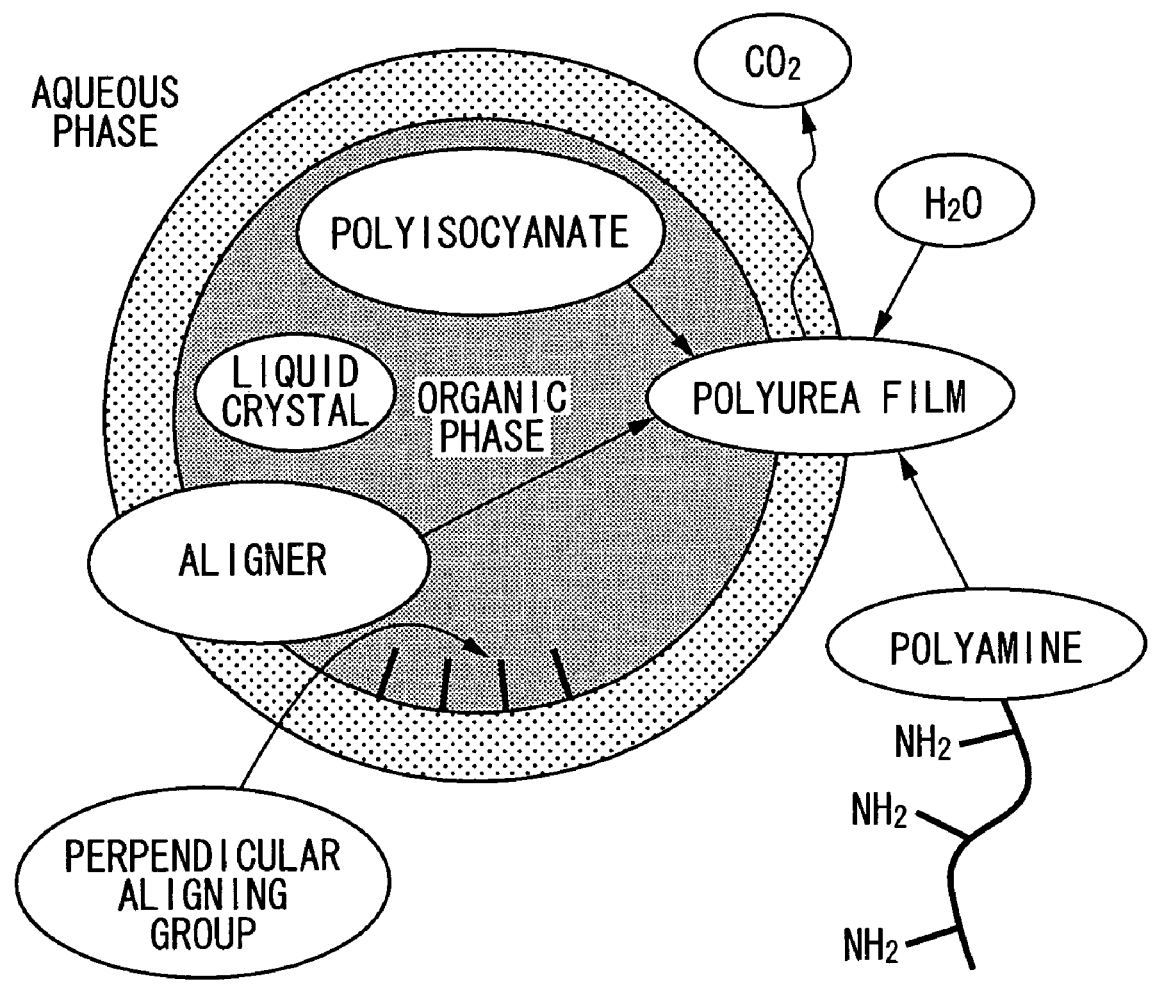
FIG. 1 is a schematic view illustrating the structure of a liquid crystal microcapsule according to the invention and the method of producing the same.

First, the structure of a liquid crystal microcapsule according to the invention together with the method of producing the same is shown schematically in FIG. 1. As shown in FIG. 1, the liquid crystal microcapsule according to the invention has a structure in which a liquid crystal is encapsulated in a polyurea film, and an alkyl group and/or a fluoroalkyl group are bonded directly or indirectly via urethane bonds to the polyurea film as perpendicular aligning groups. An organic phase is present inside the polyurea film, while an aqueous phase is present outside.

The liquid crystal microcapsule according to the invention is prepared by forming a polyurea having an alkyl group and/or a fluoroalkyl group as perpendicular aligning groups and encapsulating a liquid crystal with the polyurea, by means of allowing an aligner, which is a compound having an alkyl group and/or a fluoroalkyl group and a hydroxyl group, to react with a polyisocyanate and water ($H_2O$), as well as a polyamine as needed.

The first method of producing the liquid crystal microcapsule according to the invention, i.e., a method of producing a polyurea by allowing the aligner, which is a compound having an alkyl group and/or a fluoroalkyl group and a hydroxyl group, to react with a polyisocyanate and water will be described first.

Specifically in the first production process, an organic phase is first prepared by mixing a liquid crystal, an aligner, and a polyisocyanate. The organic phase is then dispersed in an aqueous phase, giving a dispersion. The dispersion is then heated. In this manner, it is possible to prepare a polyurea and a film thereof in a reaction among the aligner, the polyisocyanate, and water, and encapsulate the liquid crystal with the film.

In the first production process, the polyisocyanate in the organic phase reacts with water in the aqueous phase, generating a carbamic acid, which generates an amine and carbon dioxide (Formula A). The carbamic acid and the amine both react with another polyisocyanate, forming a film of polyurea (Formulae B and C).

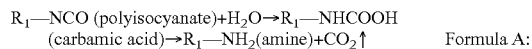  Formula A:

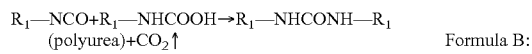  Formula B:

  Formula C:

In the Formulae above, $R^1$ is a part of the polyisocyanate other than an isocyanate group (e.g., when the polyisocyanate is xylene diisocyanate, $R^1$ represents $OCN-CH_2-C_6H_4-CH_2-$; when 1,6-hexane diisocyanate, $OCN-(CH_2)_6-$; when 4,4'-diphenylmethane diisocyanate, $OCN-C_6H_4-CH_2-C_6H_4-$).

In the first method, although the reaction of only one isocyanate group in the polyisocyanate is described in Formulae A to C, the polyisocyanate, which has two or more isocyanate groups, generates a polymer in the reactions expressed by Formula B and Formula C. A series of reactions in Formulae A to C proceed at the interface of the organic and aqueous phases, resulting in film formation. Once the film is formed, the reaction rate decreases significantly because the formed film impairs contact between polyisocyanate and water. Accordingly, if there is an area where no film is formed, the reaction proceeds predominantly in the area, consequently forming a uniform film.

The alkyl group and/or fluoroalkyl group (represented by $R_2$ in the following Formula D) are perpendicular aligning groups that induce alignment of the liquid crystal in the direction perpendicular to the film surface, and the aligner, which is a compound containing the alkyl group and/or fluoroalkyl group and a hydroxy group, is incorporated into the film via an urethane bond in a reaction of its hydroxyl group with the isocyanate group of the polyisocyanate, providing the film with a perpendicular aligning property (Formula D below). If the aligner has a binding group between the perpendicular aligning group and the hydroxyl group, the perpendicular aligning groups of an alkyl group and/or a fluoroalkyl group are incorporated into the film as they are bonded indirectly via a urethane bond thereto, giving the film a perpendicular aligning property (Formula E below).

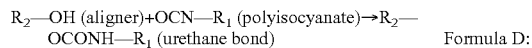  Formula D:

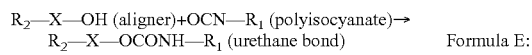  Formula E:

In the Formulae above, $R^1$ has the same meaning as that described above. $R^2$ represents an alkyl group and/or a fluoroalkyl group as a perpendicular aligning group. X represents a binding group connecting the alkyl and/or fluoroalkyl groups to the hydroxyl group (e.g., methylene group $-(CH_2)_n-$, phenylene group $-Ph-$, alkyl ester group $-OCO-(CH_2)_n-$, alkyl ether groups $-O-(CH_2)_n-$, $-(OCH_2CH_2)_n-$, and $-(OCH_2CH_2CH_2)_n-$, phenyl ester group $-OCO-Ph-$, phenyl ether group $-O-Ph-$, and the like; and n is 1 or more and 10 or less).

The solubility of the aligner in the liquid crystal is important, because it is used as dissolved in the liquid crystal. Thus, use of a binding group having an ether group such as alkyl ether group, which makes the molecule more flexible, results in an aligner superior in solubility.

The second method of producing the liquid crystal microcapsule according to the invention, i.e., a method of producing a polyurea by allowing the aligner, which is a compound having an alkyl group and/or a fluoroalkyl group and a hydroxyl group, to react with a polyisocyanate, a polyamine and water, will be described below.

Specifically in the second production process, an organic phase is prepared by mixing a liquid crystal, an aligner, and a polyisocyanate. Then, the organic phase is dispersed in an aqueous phase, giving a dispersion. The polyamine is then added to the dispersion, and the dispersion is heated. In this manner, it is possible to prepare a polyurea and a film thereof in a reaction among the aligner, the polyisocyanate, the polyamine and water, and encapsulate the liquid crystal in the film.

In the second production process, a reaction between the polyisocyanate and a polyamine occurs (Formula F) in addition to the reactions of the polyisocyanate, water and the aligner in Formulae A to C.

$$R_1\text{—NCO} + NH_2\text{—}R_3 \text{ (polyamine)} \rightarrow R_1\text{—NH—CONH—}R_3 \quad \text{Formula F:}$$

In the Formula, $R_1$ has the same meaning as that described above. $R_3$ is a part of the polyamine other than an amino group (e.g., when the polyamine is ethylenediamine, $R_3$ is $H_2N\text{—}CH_2CH_2\text{—}$; and when diethylene triamine, $H_2N\text{—}CH_2CH_2\text{—}NH\text{—}CH_2CH_2\text{—}$).

In the second production process, it is preferable to form a film by increasing the polymerization degree of the polymer formed at the interface between the organic and aqueous phases as rapidly as possible, because polymer easily diffuses into the organic phase due to thermal motion when the polymerization degree is lower in the early stage of polymerization. Generally, the reaction rate of Formula F is larger than those of Formulae A to C, thus enabling more secure generation of a uniform film.

For faster increase in the degree of polymerization, the polyamine is preferably a high-molecular weight polyamine and, in particular, a polyallylamine having a primary amino group with high reactivity. The liquid crystal microcapsule is given a harder film when the degree of crosslinking increases, and according to studies by the inventors, a harder microcapsule film gives a higher perpendicular aligning efficiency, and thus such a liquid crystal microcapsule gives a superior display performance. As for the reasons for such a hard film giving a better perpendicular aligning efficiency, the inventors believe that such a film has a greater shrinkage stress in the film surface, making the polymer main chain orient more easily along the film surface and thus improving the efficiency of orienting the side-chain in the direction perpendicular to the main chain.

In both the first and second production processes, use of a compound having only one hydroxyl group as the aligner may lead to a decrease in crosslinking density and thus a decrease in the glass transition temperature and the strength of the film. An effective method for preventing this is to introduce two or more hydroxyl groups to the aligner.

In the first and second production processes, a polyol may be added to the organic phase in addition to the isocyanate. The polyol generates a polyurethane in a reaction with a polyisocyanate (the following Formula G).

$$R_1\text{—NCO} + HO\text{—}R_4 \text{ (polyol)} \rightarrow R_1\text{—NHCOO—}R_4 \text{ (polyurethane)} \quad \text{Formula G:}$$

In the Formula, $R^1$ has the same meaning as that described above. $R^4$ represents a part of the polyol other than the hydroxyl group (e.g., when the polyol is 1,6-hexanediol, $HO(CH_2)_6$—; and when trimethylolpropane, $CH_3CH_2C(CH_2OH)_2$—$CH_2$—).

Since the reaction represented by Formula G proceeds competitively with the reactions represented by Formulae A to C and Formula F, a composite polymer of polyurethane and polyurea is produced.

In this manner, the liquid crystal microcapsule according to the invention has a film more uniform in thickness having a high perpendicular aligning efficiency. Thus, the liquid crystal microcapsule according to the invention exhibits a significantly higher display performance when used as a display device.

Hereinafter, materials used in the liquid crystal microcapsule according to the invention will be described in more detail.

First, the polyurea is a polymeric compound in which monomers are bonded to each other via an urea bond —NH-CONH—, and specifically the polyurea can be obtained by reaction of, for example, polyisocyanate and water or a polyisocyanate and a polyamine.

Examples of the polyisocyanates include 1) aliphatic polyisocyanates such as ethylene diisocyanate, tetramethylene diisocyanate, hexamethylene diisocyanate, dodecamethylene diisocyanate, 2,2,4-trimethylhexane diisocyanate, lysine diisocyanate, 2,6-diisocyanatomethylcaproate, bis(2 isocyanatoethyl)fumarate, bis(2-isocyanatoethyl)carbonate, and 2-isocyanatoethyl-2,6-diisocyanatohexanoate; 2) alicyclic polyisocyanates such as isophorone diisocyanate, dicyclohexylmethane diisocyanate, cyclohexylene diisocyanate, methyl cyclohexylene diisocyanate, bis(2-isocyanatoethyl)-4-cylcohexene-1,2-dicarboxylate; 3) arylaliphatic polyisocyanates such as xylylene diisocyanate and diethylbenzene diisocyanate; 4) aromatic polyisocyanates such as tolylene diisocyanate, diphenylmethane diisocyanate, and naphthylene diisocyanate; and the like.

In addition, polyisocyanates having three or more functional groups are particularly preferable, from the viewpoints of increasing the polymerization degree rapidly as well as increasing the crosslinking density of the polymer and thus obtaining a higher perpendicular aligning efficiency. Such polyisocyanates can be obtained as an adduct, an isocyanurate, a biuret, an allophanate or the like of the diisocyanates above, and examples thereof include the following compounds.

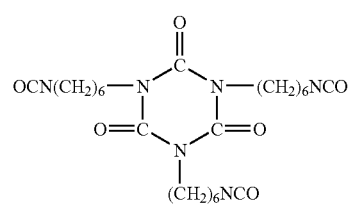

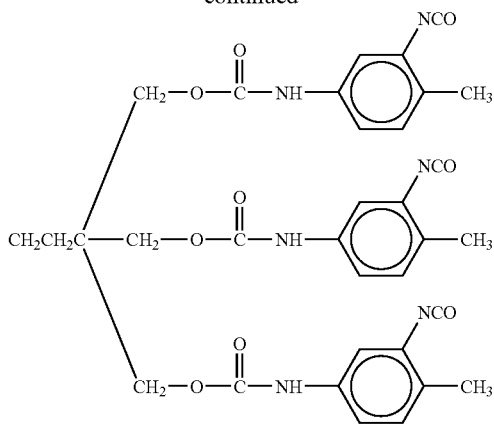

Commercial products of the compounds above include CORONATE HX (manufactured by Nippon Polyurethane Industry), BURNOCK D-750 and CRISVON NX (manufactured by DaiNippon Ink and Chemicals, Inc.), DESMODUR L (manufactured by Sumika Bayer Urethane Co., Ltd.), CORONATE L (manufactured by Nippon Polyurethane Industry), TAKENATE D102 (manufactured by Mitsui Takeda Chemicals Inc.), and the like.

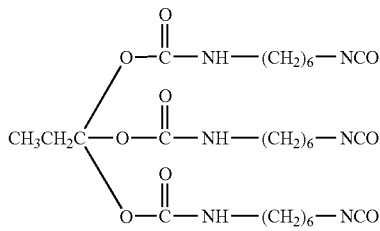

Commercial products of the compound above include BURNOCK D-950 (manufactured by DaiNippon Ink and Chemicals, Inc.).

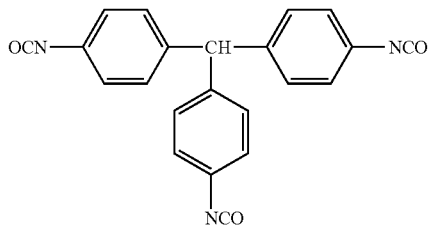

Commercial products of the compound above include DESMODUR R (manufactured by Sumika Bayer Urethane Co., Ltd.).

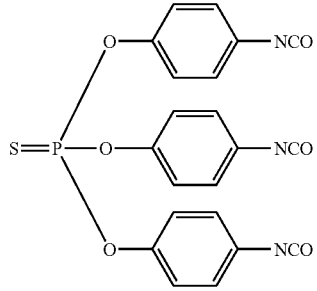

Commercial products of the compound above include DESMODUR RF (manufactured by Sumika Bayer Urethane Co., Ltd.)

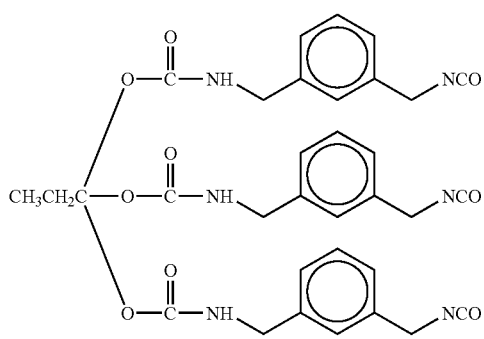

Commercial products of the compound above include TKENATE D110N (manufactured by Mitsui Takeda Chemicals Inc.).

The amount of the polyisocyanate added is 1 to 20 parts with respect to 100 (weight) parts of the liquid crystal. An amount of 1 part or less may lead to an insufficient film strength and an insufficient perpendicular aligning efficiency. An amount of 20 parts or more may lead to the deterioration in display performance due to the increase in the amount of the film in the liquid crystal microcapsule.

The aligner is a compound having at least an alkyl group and/or a fluoroalkyl group and a hydroxyl group for providing a perpendicular aligning capability.

Specifically, the perpendicular aligning groups of an alkyl group and/or a fluoroalkyl group are respectively represented by the following Formulae.

Alkyl group $R_2$: $C_nH_{2n+1}$—

Fluoroalkyl group $R_2$: $C_nF_mH_{2n-m+1}$—($m \leq 2n+1$)

Here, n indicating the chain length is preferably 4 or more and 30 or less, and more preferably 10 or more and 20 or less. An aligner having an n of less than 4 may not exhibit a sufficient perpendicular aligning efficiency. The substance having an n of 20 or more may lead to drastic decrease in film strength. Because the perpendicular aligning efficiency becomes higher when the chain length is elongated, n is preferably larger in the range above. Generally, aligners having an alkyl group are higher in compatibility with the liquid crystal than aligners having a fluoroalkyl group, but it is not always true in less polar liquid crystals such as fluoroline-based liquid crystal, and thus, these groups are preferably selected suitably according to the liquid crystal used.

Typical examples of the aligners include the compounds represented by the following Formulae.

$R_2$—OH

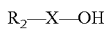

$R_2$—X—OH

In the Formulae, $R_2$ represents the perpendicular aligning group of an alkyl group and/or a fluoroalkyl group. X represents a binding group such as —$(CH_2)_n$—, —$(OCH_2)_n$—, —$(OCH_2CH_2)_n$—, —$(OCH_2CH_2CH_2)_n$—, —$COOCH_2CH_2$—, —Ph—, or —O—Ph—; and n is 1 or more and 10 or less. Among them, binding groups having an ether group, (—$(OCH_2)_n$—, —$(OCH_2CH_2)_n$—, and —$(OCH_2CH_2CH_2)_n$—), which provide the aligner molecule with flexibility and thus raise the compatibility with the liquid crystal, are favorably used in a wide range of liquid crystal materials.

Favorable examples of the aligners having two or more hydroxyl groups include the compounds represented by the following Formulae.

$R_2$—COOCH$(CH_2OH)_2$

$R_2$—COOCH$_2$CH(OH)CH$_2$OH

In the Formulae, $R_2$ represents the perpendicular aligning group of an alkyl group and/or a fluoroalkyl group.

Preferable examples of the aligners having two or more perpendicular aligning groups and a hydroxyl group include, for example, the compounds represented by the following Formula.

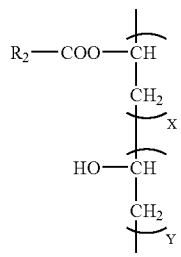

In the Formula, $R^2$ represents the perpendicular aligning group of an alkyl group and/or a fluoroalkyl group. X is an integer of 2 to 8; Y is an integer of 2 to 8; and because the aligner having two or more perpendicular aligning groups and a hydroxyl group becomes less soluble in the liquid crystal when its polymerization degree is raised, X+Y is preferably 10 or less and more preferably 5 or less.

In regard to the amount of the aligner added, the ratio of (number of hydroxyl groups of the aligner)/(number of isocyanate groups) is preferably in the range approximately of $1/100$ to $1/2$. An aligner having a ratio of lower than this range may lead to a smaller perpendicular aligning efficiency, while that having a ratio higher than the range may undesirably generate residue of the unreacted aligner or may lead to drastic decrease in crosslinking density.

Favorable examples of the polyamines include low-molecular weight polyamines such as ethylenediamine, diethylenetriamine, triethylenetetramine, tetraethylenepentamine, and hexamethylenediamine; and high-molecular weight polyamines such as chitosan, polylysine, Hoffmann-modified polyacrylamide, polyvinylamine, polyamidine, and polyallylamine.

High-molecular weight polyamines, in particular polyallylamines, are favorable as the polyamine, from the viewpoints of increasing rapidly the polymerization degree and increasing the crosslinking density of the polymer and thus obtaining a higher perpendicular aligning efficiency. The high-molecular weight polyamines, in particular polyallylamines, are also favorable, because the unreacted residue is less soluble in the liquid crystal and causes a smaller deterioration in the electrical properties of liquid crystal. Polyallylamines are commercially available as hydrochloride salts and in the free forms, but the free polyallylamines are preferable from the viewpoint of the electrical properties.

The polyamine preferably has a highly reactive primary amino group. Primary polyamines have a high reactivity, and thus can easily give a favorable film. The weight-average molecular weight of the high-molecular weight polyamine, in particular of polyallylamine, is preferably 1,000 or more and 1,000,000 or less and more preferably 10,000 or more and 100,000 or less. A higher molecular weight is effective in improving the perpendicular aligning efficiency, but an excessively higher molecular weight may cause aggregation of the capsules during polymerization, and thus the molecular weight is preferably in the range above.

From the viewpoints above, polyallylamine having many primary amino groups is particularly favorable as the polyamine, and favorable polyallylamines are, for example, the compounds represented by the following Formula.

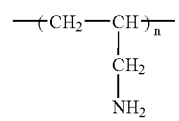

Here, n is an integer of 15 to 20,000.

In regard to the amount of the polyamine used, the ratio (number of amino groups)/(number of isocyanate groups) is preferably in the range approximately of $1/100$ to $1/1$. Polyamine, when used at a ratio of lower than this range, cannot form a satisfactory film and thus may not provide a desired perpendicular alignment effect. In addition, the polyamine only reacts in the amount of covering only the surface of the dispersed phase, and thus addition of excessive amount of polyamine may become a waste, leaving the unreacted polyamine in a greater amount.

The polyols for use include polyester polyols, polyether polyols, acryl polyols, castor oil derivatives, tall oil derivatives, and the like. A urethane bond is effective in providing the film with flexibility and thus adjusting the mechanical properties of the film, but addition of excessive polyols may cause decrease in the perpendicular aligning efficiency. Accordingly, the amount of the polyol added is preferably in an amount at which the number of hydroxyl groups is not larger than half of that of isocyanate groups.

A rod-shaped liquid crystal is favorably used as the liquid crystal, and, for example, any one of nematic, cholesteric, and smectic liquid crystals may be used. These liquid crystals are selected from known liquid crystals. Examples of the materials for the liquid crystal include known liquid crystalline compounds such as a cyanobiphenyl type, phenylcyclohexane type, phenyl benzoate type, cyclohexyl benzoate type, azomethine type, azobenzene type, pyrimidine type, dioxane type, cyclohexylcyclohexane type, stilbene type, tolan type, and the like. Generally, a mixture of some of these liquid crystalline compounds is used as the liquid crystal composition.

The cholesteric liquid crystals, optically active liquid crystalline compositions, are prepared by 1) adding an optically active compound, a so-called chiral agent, to a nematic liquid crystal composition, or 2) using a liquid crystalline composition that is optically active per se such as a cholesterol derivative. Examples of the chiral agents include cholesterol derivatives such as cholesteryl nonanoate, compounds having an optically active group such as 2-methylbutyl group, and the like.

The helical pitch of the cholesteric liquid crystal may be modified according to the kind and the amount of the chiral agent used and to the material used for the liquid crystal. The helical pitch should not be greater than the diameter of liquid crystal microcapsule, for forming an effective helical structure.

When used as a display device utilizing selective reflection, cholesteric liquid crystal microcapsules generally exhibit a reflection spectrum slightly shifted to shorter wavelength by the alignment effect of film from the selective reflection waveband of the uniformly P-oriented bulk cholesteric liquid crystal. Therefore, when the selective reflection wavelength of the cholesteric liquid crystal is set to 600 to 800 nm, the reflection spectrum of a liquid crystal microcapsule spreads over the entire visible wavelength region, enabling to provide a whitened appearance.

The liquid crystal may further contain additives such as colorant and other fine particles. The additives may also be gelated, for example, by using a crosslinkable polymer, a hydrogen-bonding gelling agent, or the like, and the molecular weight of the liquid crystal may be higher, medium, or lower; or the liquid crystal may be a mixture thereof.

Hereinafter, the first and second production processes will be described in detail. The first production process comprises the series of steps of A1) preparing an organic phase by mixing a liquid crystal, an aligner, and a polyisocyanate; A2) preparing a dispersion by dispersing the organic phase in an aqueous phase; and A3) heating the dispersion.

In the process A1), a solvent (e.g., ethyl acetate, butyl acetate, methylethylketone, toluene, or the like) may be added to the organic phase to facilitate mutual solubilization of the liquid crystal, aligner, and polyisocyanate. In addition, the organic phase may be heated. Addition of solvent is also effective in facilitating dispersion by lowering the viscosity of the organic phase.

Dispersion in the process A2) is carried out by using a rotary blade stirrer such as propeller-type, screw-type, paddle-type, internal gear-type stirrers; an ultrasonic stirrer, a jet stirrer, film emulsifier, or the like.

An emulsion stabilizer may be added to the aqueous phase for prevention of the fusion of dispersed organic phase droplets. Examples of the emulsion stabilizers include surfactants such as alkylbenzenesulfonic acid salts and polyethylene oxide alkylesters, protective colloids such as polyvinylalcohol, alkylcelluloses, hydroxycellulose, and gelatin, and the like.

The heating process 3) is a step of allow the polyisocyanate, water, the polyisocyanate, and the aligner to react with each other. The temperature and the period of heating should be suitably selected to make the reaction progress sufficiently according to the materials use, but generally, the heating temperature is approximately 50 to 100° C. and the heating period 1 to 20 hours.

The second production process comprises the series of steps of B1) preparing an organic phase by mixing a liquid crystal, an aligner, and a polyisocyanate; B2) preparing a dispersion by dispersing the organic phase in an aqueous phase; B3) adding a polyamine above to the dispersion; and B4) heating the dispersion.

Among them, the steps B1), B2), and B4) are identical with the steps A1), A2), and A3) respectively. In the polyamine-adding process B3), it is necessary to pay attention to stir the dispersion well and remove the heat generated, for making the reaction between the polyamine and the polyisocyanate, which is very rapid, to progress evenly.

The liquid crystal microcapsule according to the invention described above is normally used as a liquid crystal microcapsule film, which is formed by dispersing it in a binder resin (or its solution) and coating the resulting dispersion on a substrate. Examples of the binder resins include polymers such as polyvinylalcohol, alkylcelluloses, gelatin, polyester, polyacrylate, polymethacrylate, polyvinyl, polyurethane, epoxy, polycarbonate, polyolefin, and silicone, metal oxides that are produced in a sol-gel reaction of metal alkoxides, and the like.

In addition, any one of printing methods such as screen printing, letterpress printing, gravure printing, planographic printing, and flexographic printing; coating methods such as spin coating, bar coating, dip coating, roll coating, knife coating, and die coating; and the like may be used as the method of forming the liquid crystal microcapsule film.

The liquid crystal microcapsule according to the invention can be used, for example, in display devices, image/information-recording devices, spatial light modulators, and the like. In particular, use in display devices, i.e., liquid crystal display devices, is preferable. Hereinafter, the liquid crystal display device according to the invention will be described.

Figure 2:
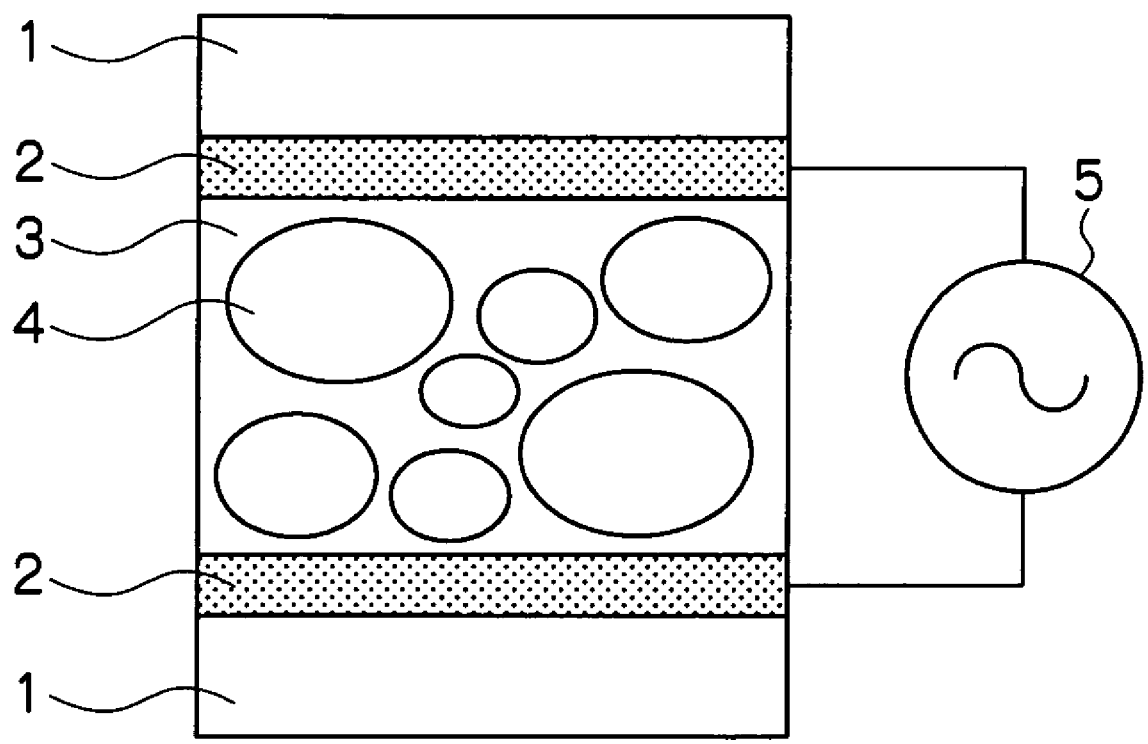
FIG. 2 is a schematic structural view illustrating one example of a liquid crystalline display device according to the invention.

The liquid crystal display device according to the invention has a structure wherein the liquid crystal microcapsule according to the invention is placed between a pair of electrodes. Specifically as shown in FIG. 2, the liquid crystal display device has a configuration, for example, comprising a liquid crystal microcapsule film containing liquid crystal microcapsules 4 dispersed in a binder 3, a pair of substrates 1 respectively having electrodes 2 holding the film between them, and a voltage application means 5 for applying voltage pulses to the electrodes and thus making the liquid crystal display device emit light. A light-absorbing member may be additionally placed between the microcapsule film and the electrodes 2 or on the rear face of substrates 1, as the background of the display. Examples of the substrates 1 include glass and resins (transparent dielectric resins such as polyethylene terephthalate, polyether sulfone, polycarbonate, and polyolefin). Examples of the electrodes 2 include transparent conductive films, for example, of indium tin oxide alloys, zinc oxide, and the like.

The display modes of the liquid crystal display device according to the invention include, in addition to the guestmost mode and the selective reflection mode, a light scattering-transmission mode and a birefringence mode. Thus, a polarization plate or a phase difference plate may be used as an auxiliary member for that purpose.

The methods of driving the liquid crystal display device according to the invention include known driving methods such as 1) segment driving method of driving liquid crystal held between two electrodes patterned in the display shape, 2) simple matrix driving method of holding a polymer/cholesteric liquid crystal dispersion between a pair of cross striped electrode substrates, scanning the respective lines one by one, and thus forming an image, 3) active matrix driving method of placing active devices such as thin film transistor, thin film diode, and MIM (metal-insulator-metal) device in each picture device and driving the liquid crystal by these active devices, 4) optical driving method of holding a laminate with a photoconductor between a pair of electrodes, forming a image while projecting an optical image and applying a voltage at the same time, 5) thermal driving method of holding a polymer/cholesteric liquid crystal dispersion between a pair of electrodes, inducing transition to the P alignment by application of a voltage, and then forming an image by heating it to a phase transition temperature or more, for example, by laser or thermal head, and 6) electrostatic driving method of coating a polymer/cholesteric liquid crystal dispersion on a electrode substrate and forming an image, for example, with stylus head or ion head.

EXAMPLES

Hereinafter, the present invention will be described in more detail with reference to Examples. However, it should be understood that the invention is not restricted by these Examples.

Example 1

A cholesteric liquid crystal selectively reflecting a light at a wavelength of 620 nm is prepared by blending a nematic liquid crystal E7 (manufactured by Merck Ltd., Japan), a chiral agent R811 (manufactured by Merck & Co., Inc.), and a chiral agent R1011 (manufactured by Merck & Co., Inc.) at a weight ratio of 86.3:11.0:2.8.

Then, an organic phase having the following composition is prepared.

Cholesteric liquid crystal: 1 g
Polyisocyanate: TKENATE D-110N (manufactured by Mitsui Takeda Chemicals Inc.): 0.13 g
Aligner: diethylene glycol hexadecane ether ($C_{16}H_{33}$—$(OCH_2CH_2)_2$—OH): 0.05 g
Solvent: ethyl acetate: 10 g The organic phase obtained is poured into 100 g of an aqueous 1% polyvinylalcohol solution, and the mixture is dispersed by using a propeller stirrer, to give a dispersion having particles of an average diameter of 7 μm. The dispersion is allowed to react in a container placed in a water bath at 85° C. for 2 hours. Microscopic observation reveals that a uniform film is obtained.

Then, the dispersion is concentrated by allowing liquid crystal microcapsules of the dispersion to sediment in a centrifugal separator and disposing the supernatant liquid. After addition of purified water and agitation, the aqueous dispersion is similarly concentrated repeatedly twice, for washing the liquid crystal microcapsules. As a binder a polyvinylalcohol solution is added to the concentrated dispersion, to give a liquid crystal microcapsule coating solution. The weight ratio of the liquid crystal microcapsule to polyvinylalcohol is 75:25.

The liquid crystal microcapsule coating solution is applied with an applicator onto a polyethylene terephthalate (PET) substrate having an indium tin oxide (ITO) electrode, to give a liquid crystal microcapsule film having a dry thickness of 32 μm. A black paint containing carbon black in a polyvinylalcohol aqueous solution is applied over the film to a dry thickness of 3 μm. Separately, a substrate having an electrode is prepared as the other substrate; a two-solution type urethane adhesive is applied over there to a thickness of 3 μm; and the substrates are bonded onto the liquid crystal microcapsule film, to give a liquid crystal display device.

Burst pulses of a symmetrical rectangular wave at a frequency of 1 KHz and a length of 200 ms are applied between the top and bottom electrodes on the liquid crystal display device, and the reflectance at the selective reflection wavelength is determined after application of pulses. The reflectance properties of the device are measured while changing the pulse voltage and the maximum and minimum reflectances are determined; and the contrast ratio thereof, maximum reflectance:minimum reflectance, are determined. The contrast ratio is favorably 15.7:1.

Example 2

A liquid crystal display device is prepared from a liquid crystal microcapsule that is prepared in a similar manner to Example 1, except that 2.5 g of an aqueous 2% solution of polyallylamine (trade name: PAA-H10C, manufactured by Nitto Boseki Co. Ltd.; weight-average molecular weight: 100,000) is added to the dispersion prepared. The contrast ratio of the liquid crystal display device employing the liquid crystal microcapsule is favorably 30.4:1 and significantly better than that of Example 1.

Figure 3:
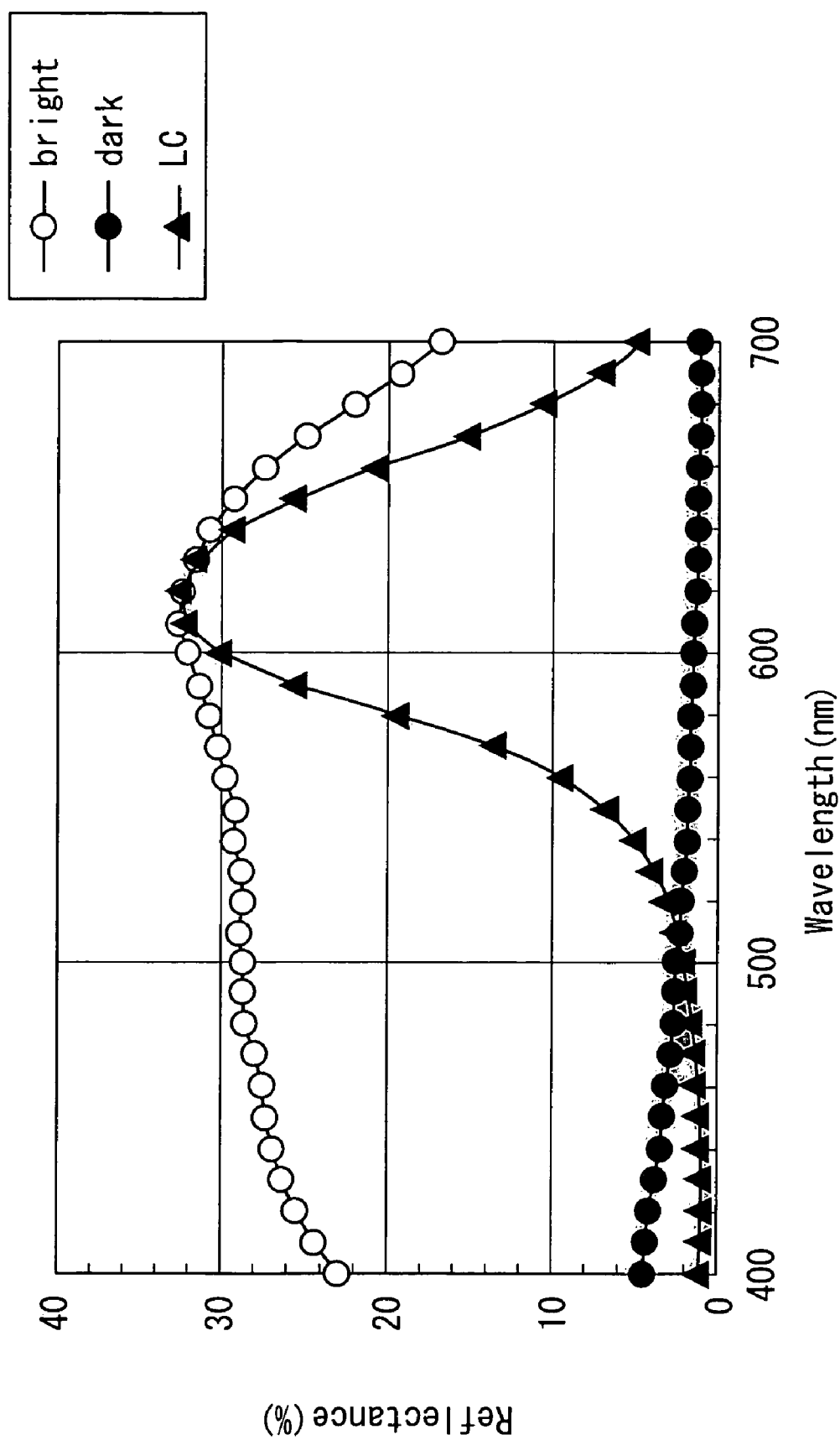
FIG. 3 is a chart showing the reflection spectrum of the cholesteric liquid crystal (LC) used in Example 2 and the reflection spectra at bright displaying (bright) and dark displaying (dark) of the liquid crystal display device.
Figure 4A:
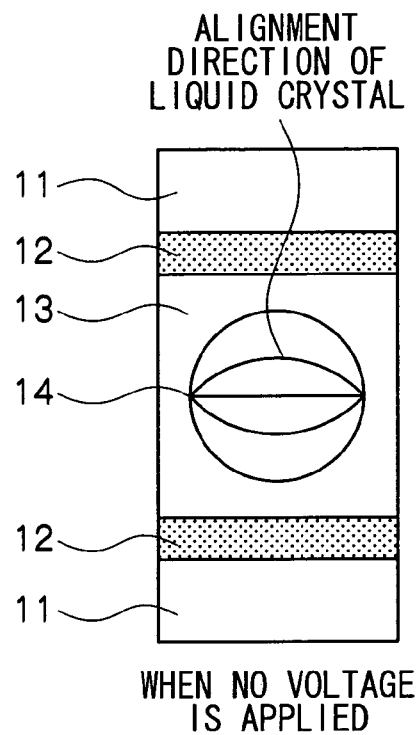
FIGS. 4A and 4B are views illustrating the alignment states of the liquid crystal in an alignment-uncontrolled liquid crystal microcapsule.
Figure 4B:
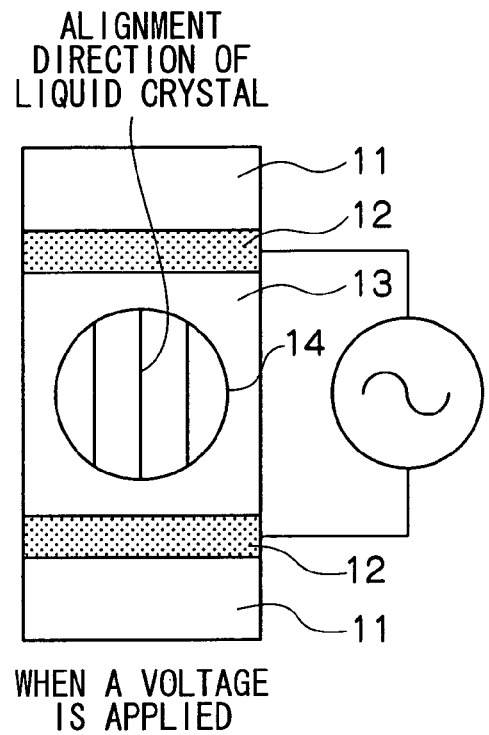
Figure 4C:
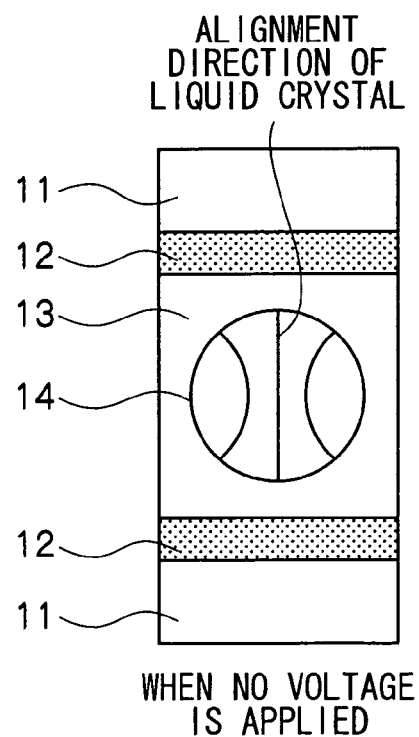
FIGS. 4C and 4D are views illustrating the alignment states of the liquid crystal in an alignment-controlled liquid crystal microcapsule.
Figure 4D:
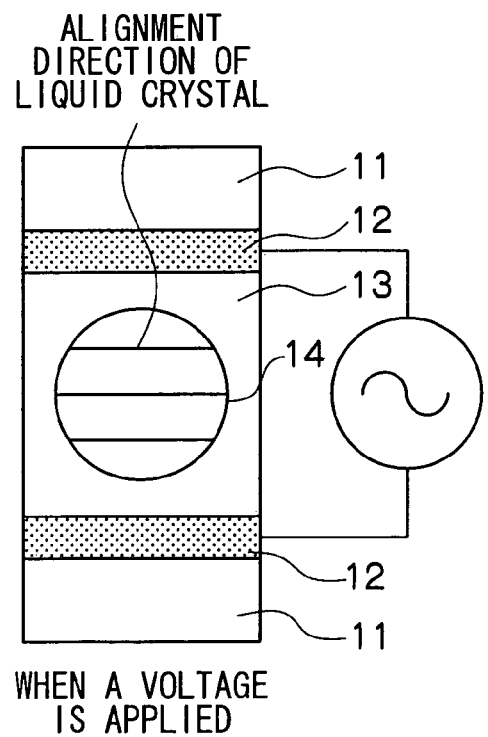

The reflection spectrum of the cholesteric liquid crystal (LC) used and the reflection spectra of the liquid crystal display device when bright and dark are shown in FIG. 3.

As shown in FIG. 3, in Example 2, the cholesteric liquid crystal used exhibits a red-selective reflection having a peak at a wavelength of 620 nm, while the reflection spectrum of the liquid crystal microcapsule shows a reflectance expanded over the shorter wavelength range, enabling favorable white display.

Example 3

A liquid crystal display device is obtained from a liquid crystal microcapsule prepared in a similar manner to Example 2, except that 1-octanol is used as the aligner. The contrast ratio of the liquid crystal display device employing the liquid crystal microcapsule is 8.8:1.

Example 4

A liquid crystal display device is obtained from a liquid crystal microcapsule prepared in a similar manner to Example 2, except that 1-dodecanol is used as the aligner. The contrast ratio of the liquid crystal display device employing the liquid crystal microcapsule is favorably 22.4:1, which demonstrates a significant effect of the increase in chain length of the aligner from that of Example 3.

Example 5

A liquid crystal display device is prepared from a liquid crystal microcapsule prepared in a similar manner to Example 2, except that 1-pentadecanol is used as the aligner. The contrast ratio of the liquid crystal display device employing the liquid crystal microcapsule is favorably 27.0:1, which demonstrates an effect of the further increase in chain length of the aligner from that of Example 4.

Example 6

A liquid crystal display device is prepared from a liquid crystal microcapsule prepared in a similar manner to Example 2, except that perfluorodecylethanol having a fluoroalkyl group is used as the aligner. The contrast ratio of the liquid crystal display device employing the liquid crystal microcapsule is 8.3:1.

Example 7

A liquid crystal display device is prepared from a liquid crystal microcapsule prepared in a similar manner to Example 2, except that glycerol monoisostearate having two hydroxyl groups is used as the aligner. The contrast ratio of the liquid crystal display device employing the liquid crystal microcapsule is 18.5:1.

Comparative Example 1

A liquid crystal display device is prepared from a liquid crystal microcapsule prepared in a similar manner to Example 2, except that no aligner is used. The contrast ratio of the liquid crystal display device employing the liquid crystal microcapsule is 6:1.

Comparative Example 2

A nematic liquid crystal E7 (manufactured by Merck Ltd., Japan), a chiral agent R811 (manufactured by Merck & Co., Inc.), and a chiral agent R1011 (manufactured by Merck & Co., Inc.) are blended at a ratio of 86.3:11.0:2.8 by weight, to give a cholesteric liquid crystal exhibiting selective reflection at a wavelength of 620 nm.

Then, the following components are mixed, to give an organic phase.

Cholesteric liquid crystal: 0.85 g
Monomer: $CH_2=C(CH_3)COOCH_2(CH_2)_{16}CH_3$: 0.060 g
Monomer: $CH_2=CHCOOCH_2C_2F_5$: 0.045 g
Monomer: $C_2H_5C(CH_2OCOCH=CH_2)_3$: 0.045 g
Radical polymerization initiator: azoisobutylonitrile: 0.003 g
Solvent: ethyl acetate: 10 g The organic phase obtained is poured into an aqueous 1% polyvinylalcohol solution 100 g, and the mixture is dispersed by using a propeller stirrer, to give a dispersion containing particles having an average diameter 10 μm. The dispersion is heated at 90° C. for 6 hours in a nitrogen environment, allowing radical polymerization of the monomers to proceed, to give a liquid crystal microcapsule.

Then, the dispersion is concentrated by allowing liquid crystal microcapsules of the dispersion to sediment in a centrifugal separator and disposing the supernatant liquid. After addition of purified water and agitation, the aqueous dispersion is similarly concentrated repeatedly twice, for washing the liquid crystal microcapsules. As a binder, a polyvinylalcohol solution is added to the concentrated dispersion, to give a liquid crystal microcapsule coating solution. The weight ratio of the liquid crystal microcapsule to polyvinylalcohol is 75:25.

The liquid crystal microcapsule coating solution is applied with an applicator onto a polyethylene terephthalate (PET) substrate having an indium tin oxide (ITO) electrode, to give a liquid crystal microcapsule film having a dry thickness of 30 μm. A relatively large number of liquid crystal capsules having leakage of the liquid crystal are observed. Separately, a substrate having the electrode is prepared as the other substrate; a two-solution type urethane adhesive is applied over there to a thickness of 3 μm; and the substrates are bonded onto the liquid crystal microcapsule film, to give a liquid crystal display device.

Burst pulses of a symmetrical rectangular wave at a frequency of 1 KHz and a length of 200 ms are applied between the top and bottom electrodes on the liquid crystal display device, and the maximum and minimum reflectances are determined. The contrast ratio is lower at 5.0:1.

Results obtained in Examples 1 to 7 and Comparative Examples 1 and 2 are summarized in Table 1. All liquid crystal display devices obtained in Examples had a contrast ratio more favorable than those of Comparative Examples.

TABLE 1

| | Aligner | Primary polyamine | Contrast ratio |
|---|---|---|---|
| Example 1 | Diethylene glycol hexadecane ether | None | 15.7:1 |
| Example 2 | Diethylene glycol hexadecane ether | Polyallylamine | 30.4:1 |
| Example 3 | 1-Octanol | Polyallylamine | 8.8:1 |
| Example 4 | 1-Dodecanol | Polyallylamine | 22.4:1 |
| Example 5 | 1-Pentadecanol | Polyallylamine | 27.0:1 |
| Example 6 | Perfluorodecylethanol | Polyallylamine | 8.3:1 |
| Example 7 | Glycol monoisostearate | Polyallylamine | 18.5:1 |
| Comparative Example 1 | None | Polyallylamine | 6.1:1 |
| Comparative Example 2 | — | — | 5.0:1 |

Example 8

A black dichroic colorant S-344 (manufactured by Mitsui Toatsu Chemicals) is added to a negative type nematic liquid crystal ZLI-2806 (manufactured by Merck Ltd., Japan) in an amount of 2 wt %, to give a guest-most liquid crystal.

Then, the following components are blended, to give an organic phase.

Guest-host liquid crystal: 1 g
Polyisocyanate: TAKENATE D-110N (manufactured by Mitsui Takeda Chemicals Inc.): 0.13 g
Aligner: diethylene glycol hexadecane ether: 0.05 g
Solvent: ethyl acetate: 10 g The organic phase is poured into an aqueous 1% polyvinylalcohol solution 100 g, and the mixture is dispersed by using a propeller stirrer, to give a dispersion containing particles having an average diameter 7 μm. The dispersion is placed in a container and allowed to react at 85° C. in a water bath for 2 hours.

Then, the dispersion is concentrated by allowing liquid crystal microcapsules of the dispersion to sediment in a centrifugal separator and disposing the supernatant liquid. After addition of purified water and agitation, the aqueous dispersion is similarly concentrated repeatedly twice, for washing the liquid crystal microcapsules. As a binder, a polyvinylalcohol solution is added to the concentrated dispersion, to give a liquid crystal microcapsule coating solution. The weight ratio of the liquid crystal microcapsule to polyvinylalcohol is 75:25.

The liquid crystal microcapsule coating solution is applied with an applicator onto a polyethylene terephthalate (PET) substrate having an indium tin oxide (ITO) electrode, to give a liquid crystal microcapsule film having a dry thickness of 15 μm. Separately, a substrate having the electrode is prepared as the other substrate; a two-solution type urethane adhesive is coated over there to a thickness of 3 μm; and the substrates are bonded onto the liquid crystal microcapsule film, to give a liquid crystal display device.

Application of a symmetrical rectangular wave at a frequency of 1 KHz between the top and bottom electrodes of the liquid crystal display device on a white background results in favorable bright and dark display.

Example 10

First, the following components are blended, to give an organic phase.

Nematic liquid crystal E7: 1 g

Polyisocyanate: TAKENATE D-110N (manufactured by Mitsui Takeda Chemicals Inc.): 0.13 g Aligner: diethylene glycol hexadecane ether: 0.05 g Solvent: ethyl acetate: 10 g The organic phase is poured into 100 g of an aqueous 1% polyvinylalcohol solution, and the mixture is dispersed by using a propeller stirrer, to give a dispersion containing particles having an average diameter 1 μm. The dispersion is placed in a container and allowed to react at 85° C. in a water bath for 2 hours.

Then, the dispersion is concentrated by allowing liquid crystal microcapsules of the dispersion to sediment in a centrifugal separator and disposing the supernatant liquid. After addition of purified water and agitation, the aqueous dispersion is similarly concentrated repeatedly twice, for washing the liquid crystal microcapsules. As a binder, a polyvinylalcohol solution is added to the concentrated dispersion, to give a liquid crystal microcapsule coating solution. The weight ratio of the liquid crystal microcapsule to polyvinylalcohol is 75:25.

The liquid crystal microcapsule coating solution is coated with a gap applicator onto a polyethylene terephthalate (PET) substrate having a substrate indium tin oxide (ITO) electrode, to give a liquid crystal microcapsule film having a dry thickness of 15 μm. Separately, a substrate having the electrode is prepared as the other substrate; a two-pack urethane adhesive is coated over there to a thickness of 3 μm; and the substrates are bonded onto the liquid crystal microcapsule film, to give a liquid crystal display device.

Application of a symmetrical rectangular wave at a frequency of 1 KHz between the top and bottom electrodes of the liquid crystal display device results in favorable scattering-transmission display.

Example 11

A liquid crystal display device is obtained from a liquid crystal microcapsule prepared in a similar manner to Example 9, except that 2.5 g of an aqueous 2% solution of polyallylamine PAA-H10C (manufactured by Nitto Boseki Co. Ltd.: weight-average molecular weight 100,000) is added after preparation of the dispersion. Application of a symmetrical rectangular wave at a frequency of 1 KHz between the top and bottom electrodes of the liquid crystal display device results in favorable bright and dark display more favorable than that of Example 9.

Example 12

A liquid crystal display device is prepared from a liquid crystal microcapsule prepared in a similar manner to Example 10, except that 2.5 g of an aqueous 2% solution of polyallylamine PAA-$H_{10}$C (manufactured by Nitto Boseki Co. Ltd.: weight-average molecular weight 100,000) is added after preparation of the dispersion. Application of a symmetrical rectangular wave at a frequency of 1 KHz between the top and bottom electrodes of the liquid crystal display device results in favorable scattering-transmission display more favorable than that of Example 10.

Example 13

First, the following components are blended, to give an organic phase.

Smectic A liquid crystal: S2 (manufactured by Merck & Co., Inc.): 1 g

Polyisocyanate: TAKENATE D-110N (manufactured by Mitsui Takeda Chemicals Inc.): 0.13 g Aligner: diethylene glycol hexadecane ether: 0.05 g Solvent: ethyl acetate: 10 g The organic phase obtained is poured into 100 g of an aqueous 1% polyvinylalcohol solution, and the mixture is dispersed by using a propeller stirrer, to give a dispersion having particles of an average diameter of 1 μm. The dispersion is allowed to react in a container placed in a water bath at 85° C. for 2 hours.

Then, the dispersion is concentrated by allowing liquid crystal microcapsules of the dispersion to sediment in a centrifugal separator and disposing the supernatant liquid. After addition of purified water and agitation, the aqueous dispersion is similarly concentrated repeatedly twice, for washing the liquid crystal microcapsules. As a binder, a polyvinylalcohol solution is added to the concentrated dispersion, to give a liquid crystal microcapsule coating solution. The weight ratio of the liquid crystal microcapsule to polyvinylalcohol is 75:25.

The liquid crystal microcapsule coating solution is applied with a gap applicator onto a polyethylene terephthalate (PET) substrate having an indium tin oxide (ITO) electrode, to give a liquid crystal microcapsule film having a dry thickness of 20 μm. Separately, a substrate having the electrode is prepared as the other substrate; a two-solution type urethane adhesive is coated over there to a thickness of 3 μm; and the substrates are bonded onto the liquid crystal microcapsule film, to give a liquid crystal display device.

The liquid crystal display device obtained is white in color. Application of a symmetrical rectangular wave at a frequency of 1 KHz and a voltage of 200 V between the top and bottom electrodes results in change to transparency. When heated to the isotropic phase transition temperature of 48° C. or more and then cooled to room temperature, the liquid crystal display device returns to white again. Thus, it is possible to produce an electrically writing and thermal erasing display medium.

Example 14

A liquid crystal display device is prepared from a liquid crystal microcapsule prepared in a similar manner to Example 13, except that 2.5 g of an aqueous 2% solution of polyallylamine PAA H10C (manufactured by Nitto Boseki Co. Ltd.: weight-average molecular weight 100,000) is added after preparation of the dispersion. Application of a symmetrical rectangular wave at a frequency of 1 KHz between the top and bottom electrodes of the liquid crystal display device resulted in scattering-transmission display more favorable than that of Example 13.

As described above, the invention provides a liquid crystal microcapsule having a uniform film thickness and a favorable perpendicular aligning efficiency and a process for conveniently producing the same. The invention also provides a liquid crystal display device employing the liquid crystal microcapsule.

What is claimed is:

1. A liquid crystal microcapsule, comprising a liquid crystal, a polyurea film encapsulating the liquid crystal, and an aligning group disposed within the liquid crystal and bonded directly or indirectly via a urethane bond to the polyurea, wherein the aligning group is selected from the group consisting of an alkyl group of the formula $C_nH_{2n+1}$— and a fluoroalkyl group of the formula $C_nF_mH_{2n-m+1}$— ($m \leq 2n+1$), wherein $10 \leq n \leq 30$, and wherein the aligning group is soluble in the liquid crystal.

2. The liquid crystal microcapsule according to claim 1, wherein the liquid crystal is a cholesteric liquid crystal.

3. The liquid crystal microcapsule according to claim 2, wherein the peak wavelength of selective reflection of the cholesteric liquid crystal is in the range of 600 to 800 nm.

4. The liquid crystal microcapsule according to claim 1, wherein the liquid crystal is a nematic liquid crystal.

5. The liquid crystal microcapsule according to claim 1, wherein the liquid crystal is a smectic liquid crystal.

6. A liquid crystal display device, comprising a pair of electrodes and the liquid crystal microcapsule according to claim 1 placed therebetween.

7. A method of producing a liquid crystal microcapsule, comprising: forming a polyurea and a film thereof by allowing an aligner, which is a compound having a hydroxyl group and at least one aligning group selected from the group consisting of an alkyl group of the formula $C_nH_{2n+1}$— and a fluoroalkyl group of the formula $C_nF_mH_{2n-m+1}$—($m \leq 2n+1$), wherein $10 \leq n \leq 30$, to react with a polyisocyanate and water; and encapsulating a liquid crystal with the film wherein the aligning group is disposed within the encapsulated liquid crystal and bonded directly or indirectly via a urethane bond to the polyurea, and wherein the aligner is soluble in the liquid crystal.

8. The method of producing a liquid crystal microcapsule according to claim 7, comprising: preparing an organic phase by mixing the liquid crystal, the aligner, and the polyisocyanate; preparing a dispersion by dispersing the organic phase in an aqueous phase; and forming the polyurea and the film thereof by heating the dispersion and allowing the aligner, the polyisocyanate, and the water to react; and encapsulating the liquid crystal with the film.

9. The method of producing a liquid crystal microcapsule according to claim 7, wherein the aligner additionally has an ether group.

10. The method of producing a liquid crystal microcapsule according to claim 7, wherein the aligner has a plurality of hydroxyl groups.

11. The method of producing a liquid crystal microcapsule according to claim 7, wherein the liquid crystal is a cholesteric liquid crystal.

12. The method of producing a liquid crystal microcapsule according to claim 11, wherein the peak wavelength of selective reflection of the cholesteric liquid crystal is in the range of 600 to 800 nm.

13. The method of producing a liquid crystal microcapsule according to claim 7, wherein the liquid crystal is a nematic liquid crystal.

14. The method of producing a liquid crystal microcapsule according to claim 7, wherein the liquid crystal is a smectic liquid crystal.

15. The method of producing a liquid crystal microcapsule according to claim 7, wherein the fluoroalkyl group is bonded directly or indirectly via a urethane bond to the polyurea through the reaction of the aligner with the polyisocyanate and water.

16. A method of producing a liquid crystal microcapsule, comprising: forming a polyurea and a film thereof by allowing an aligner, which is a compound having a hydroxyl group and at least one aligning group selected from the group consisting of a hydrophobic alkyl group of the formula $C_nH_{2n+1}$— and a hydrophobic fluoroalkyl group of the formula $C_nF_mH_{2n-m+1}$— ($m \leq 2n+1$), wherein $10 \leq n \leq 30$, to react with a polyisocyanate, a polyamine, and water; and encapsulating a liquid crystal with the film wherein the aligning group is disposed within the encapsulated liquid crystal and bonded directly or indirectly via a urethane bond to the polyurea, and wherein the aligner is soluble in the liquid crystal.

17. The method of producing a liquid crystal microcapsule according to claim 16, comprising: preparing an organic phase by mixing the liquid crystal, the aligner, and the polyisocyanate; preparing a dispersion by dispersing the organic phase in an aqueous phase; adding the polyamine to the dispersion; forming a polyurea and the film thereof by heating the dispersion and allowing the aligner, the polyisocyanate, the polyamine, and water to react; and encapsulating the liquid crystal with the film.

18. The method of producing a liquid crystal microcapsule according to claim 16, wherein the aligner additionally has an ether group.

19. The method of producing a liquid crystal microcapsule according to claim 16, wherein the aligner has a plurality of hydroxyl groups.

20. The method of producing a liquid crystal microcapsule according to claim 16, wherein the polyamine is a polyallylamine.

21. The method of producing a liquid crystal microcapsule according to claim 16, wherein the liquid crystal is a cholesteric liquid crystal.

22. The method of producing a liquid crystal microcapsule according to claim 21, wherein the peak wavelength of selective reflection of the cholesteric liquid crystal is in the range of 600 to 800 nm.

23. The method of producing a liquid crystal microcapsule according to claim 16, wherein the liquid crystal is a nematic liquid crystal.

24. The method of producing a liquid crystal microcapsule according to claim 16, wherein the liquid crystal is a smectic liquid crystal.

25. The method of producing a liquid crystal microcapsule according to claim 16, wherein the fluoroalkyl group is bonded directly or indirectly via a urethane bond to the polyurea through the reaction of the aligner with the polyisocyanate and water.

* * * * *